US006453703B1

United States Patent
Johnson et al.

(12) United States Patent
(10) Patent No.: US 6,453,703 B1
(45) Date of Patent: Sep. 24, 2002

(54) SPINNER DISC AND ROTARY FIBERIZATION PROCESS

(75) Inventors: Walter A. Johnson, Aurora, CO (US); Doug Ferreira, Artois, CA (US); Gerard J. DeMott, Evergreen, CO (US); Yifang Cal, Littleton, CO (US)

(73) Assignee: Johns Manville International, Inc., Denver, CO (US)

( * ) Notice: Subject to any disclaimer, the term of this patent is extended or adjusted under 35 U.S.C. 154(b) by 55 days.

(21) Appl. No.: 09/745,163

(22) Filed: Dec. 20, 2000

(51) Int. Cl.[7] .............................................. C03B 37/04
(52) U.S. Cl. .............................. 65/459; 65/460; 65/461; 65/516; 65/522; 65/523; 65/521; 425/8
(58) Field of Search .......................... 65/459, 460, 461, 65/516, 522, 523, 521; 425/8

(56) References Cited

U.S. PATENT DOCUMENTS

| | | | | |
|---|---|---|---|---|
| 3,928,009 A | * | 12/1975 | Perry .............................. | 425/8 |
| 4,270,943 A | * | 6/1981 | Riddell ......................... | 65/521 |
| 4,678,490 A | * | 7/1987 | Miller ............................ | 425/8 |
| 4,948,409 A | * | 8/1990 | Chenoweth .................... | 65/522 |
| 5,015,278 A | * | 5/1991 | Lee ............................... | 65/523 |
| 5,785,996 A | * | 7/1998 | Snyder ......................... | 65/521 |
| 6,167,729 B1 | * | 1/2001 | Watton ......................... | 65/497 |

* cited by examiner

Primary Examiner—James Derrington
(74) Attorney, Agent, or Firm—Robert D. Touslee

(57) ABSTRACT

A spinner disc for a rotary fiberization process, includes a base plate and an annular peripheral sidewall extending upward from the base plate which has a plurality of rows of fiberizing holes therein for fiberizing molten thermoplastic fiberizable materials by centrifugal force. The base plate has: a central bore therein on a rotational axis of the spinner disc for mounting the spinner disc on a drive shaft; an outer annular portion for receiving molten thermoplastic fiberizable materials to be fiberized; and an inner annular portion intermediate the central bore and, the outer annular base plate portion. A plurality of slits in the inner annular portion of the base plate, passing completely through the base plate from an upper surface of the base plate to a lower surface of the base plate and radiating outward from a periphery of the central bore, relieve stresses in the base plate, especially during a start-up of a fiberizing process, and permit hot gases to pass out from within the spinner disc during a fiberizing operation to heat the underside of the spinner disc.

39 Claims, 2 Drawing Sheets

SPINNER DISC AND ROTARY FIBERIZATION PROCESS

BACKGROUND OF THE INVENTION

The present invention relates to a spinner disc for a rotary fiberization process and a rotary fiberization process which utilizes the spinner disc, and, in particular, to a spinner disc which has a plurality of slits in an inner annular portion of the spinner disc base plate that pass completely through the base plate from an upper surface of the base plate to a lower surface of the base plate and radiate outward from a periphery of a central bore in the spinner disc base plate. These; slits relieve stresses in the base plate and permit hot gases to pass out from within the spinner disc during operation which can further heat the underside of the spinner disc and a region adjacent an outer corner of the spinner disc to maintain a lower portion of a spinner disc sidewall adjacent.the outer annular corner of the spinner disc at a higher temperature for improved fiberization.

In high temperature rotary fiberization processes which fiberize molten thermoplastic fiberizable materials by using centrifugal force to pass the molten thermoplastic fiberizable material through rows of fiberizing holes in an annular peripheral sidewall of a spinner disc, such as but not limited to rotary glass-fiberizing processes which typically fiberize molten glass at temperatures in excess of 1800° F., the base plate of the spinner discs undergoes high initial transient stresses during the start-up of the fiberizing operation. These high initial transient stresses can be above the yield strength of the high temperature resistant alloy used to form the spinner disc and can cause elastic-plastic fracture of the base plate and spinner disc failure.

The base plate of a spinner disc has a central bore therein on a rotational axis of the spinner disc for mounting the spinner disc on a drive shaft; an outer annular portion for receiving the hot molten thermoplastic fiberizable material to be fiberized; and an inner annular portion intermediate the central bore and the outer annular base plate portion. The spinner disc is normally preheated during the start-up of such high temperature fiberizing operations to reduce the stresses in the spinner disc at the start-up of a fiberzing operation. However, during start-up when the hot molten thermoplastic fiberzable material, e.g. glass at a temperature in excess of 1800° F., is first introduced onto the outer annular portion of the spinner disc base plate, the temperature differential between the outer annular portion of the base plate and the inner annular portion of the base plate, adjacent the central bore, can be in excess of 800° F. or 900° F. with the temperature of the outer annular portion of the base plate about 1400° F. and the temperature of the inner annular portion of the base plate, adjacent the central bore, about 500° F. This transient temperature differential at start-up sets up transient compressive stresses in the outer annular portion of the base plate and transient tensile stresses in the inner annular portion of the base plate which can cause the base plate of the spinner disc to rupture, come apart or fail and, thus, the spinner disc, which is typically rotating at thousands of revolutions per minute, to fail at the start-up of the fiberizing operation. The potential for such failures presents both operational and safety problems in a commercial production line.

For good fiberization of molten thermoplastic fiberizable materials in high temperature rotary fiberization processes that use centrifugal force to pass the molten thermoplastic fiberizable material through rows of fiberizing holes in an annular peripheral sidewall of a spinner disc, such as but not limited to rotary glass fiberizing processes which typically fiberize molten glass at temperatures in excess of 1800° F., the temperature of the annular peripheral sidewall must be maintained high enough for proper glass flow through the fiberizing holes in the annular peripheral sidewall. Thus, for good fiberization sufficient heat must be delivered to the annular sidewall of the spinner disc and retained in the annular sidewall to maintain the sidewall at the temperature desired for fiberization. In practice, the lower portion of the spinner disc sidewall adjacent the juncture of the spinner disc base plate and the spinner disc sidewall, where the lower rows of fiberizing holes are located, has been difficult to maintain at a desired temperature for good fiberization. For example, it is possible for this outer annular corner of the spinner disc and the lower rows of fiberizing holes adjacent this outer annular corner to become too cold for proper fiberization due to the entrapment of ambient air, fluid turbulence, and fluid recirculation in the region of the outer annular corner of the spinner disc. One relatively expensive and cumbersome method used to retain heat in the base plate and the lower portion of the spinner disc sidewall, adjacent the outer annular corner of the spinner disc, to keep this portion of the sidewall at a higher temperature for good fiberization involves securing an insulator plate or disc to the underside of the spinner disc. The insulator plate or disc is spaced below the underside of the spinner disc, is generally coextensive in size with the underside of the spinner disc, and both insulates and radiates heat back onto the underside of the spinner disc to maintain the underside of the spinner disc and the lower portion of the spinner disc sidewall adjacent the outer corner of the spinner disc at a higher temperature for good fiberization. However, this solution to the problem requires the use of additional components and the cost of the insulator plate and its installation and maintenance add to the production costs of the manufacturing operation.

SUMMARY OF THE INVENTION

The present invention provides a cost effective solution to both of the problems discussed above which have plagued high temperature rotary fiberization processes i.e. the high transient stresses normally encountered in the spinner disc base plates at start-up and the need to maintain the lower portions of the spinner disc sidewalls at a sufficiently high temperature for good fiberization. The spinner disc of the present invention includes: a base plate and an annular peripheral sidewall extending upward from and integral with the base plate which has a plurality of rows of fiberizing holes therein for fiberizing thermoplastic fiberizable materials by centrifugal force. The base plate has: a central bore therein on a rotational axis of the spinner disc for mounting the spinner disc on a drive shaft; an outer annular portion for receiving molten thermoplastic fiberizable materials to be fiberized; and an inner annular portion intermediate the central bore and the outer annular base plate portion. The base plate has a plurality of slits in the inner annular portion passing completely through the base plate from an upper surface of the base plate to a lower surface of the base plate and radiating outward from a periphery of the central bore. These slits relieve stresses in the base plate and permit hot gases to pass out from within the spinner disc during operation to heat the underside of the base plate and the region adjacent the outer lower corner of the spinner disc where the base plate meets the sidewall to help maintain the lower portion of the spinner disc sidewall and the fiberizing holes in the lower portion of the spinner disc sidewall at a desired temperature for fiberization.

DESCRIPTION OF THE PREFERRED EMBODIMENTS

The spinner discs 20 of the -present invention are especially suited for fiberizing molten thermoplastic fiberizable materials 28, such as but not limited to glass, into fibers in elevated temperature (e.g. operating temperatures of about 1800° F. and greater) rotary fiberizing processes. Preferably, the spinner discs 20 are made from various elevated temperature resistant alloys that form protective oxide films on their surfaces when exposed to the air or the atmosphere, such as but not limited to elevated temperature resistant stainless iron, nickel and cobalt alloys.

Figure 1:
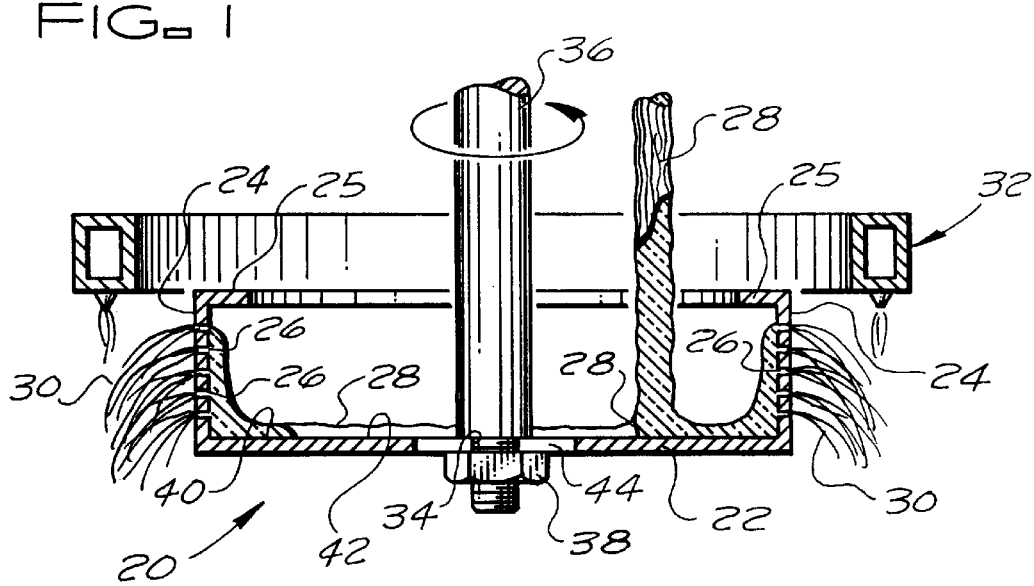
FIG. 1 is a schematic vertical cross section through a typical fiberizing station using the spinner disc and the fiberizing method of the present invention.
Figure 2:
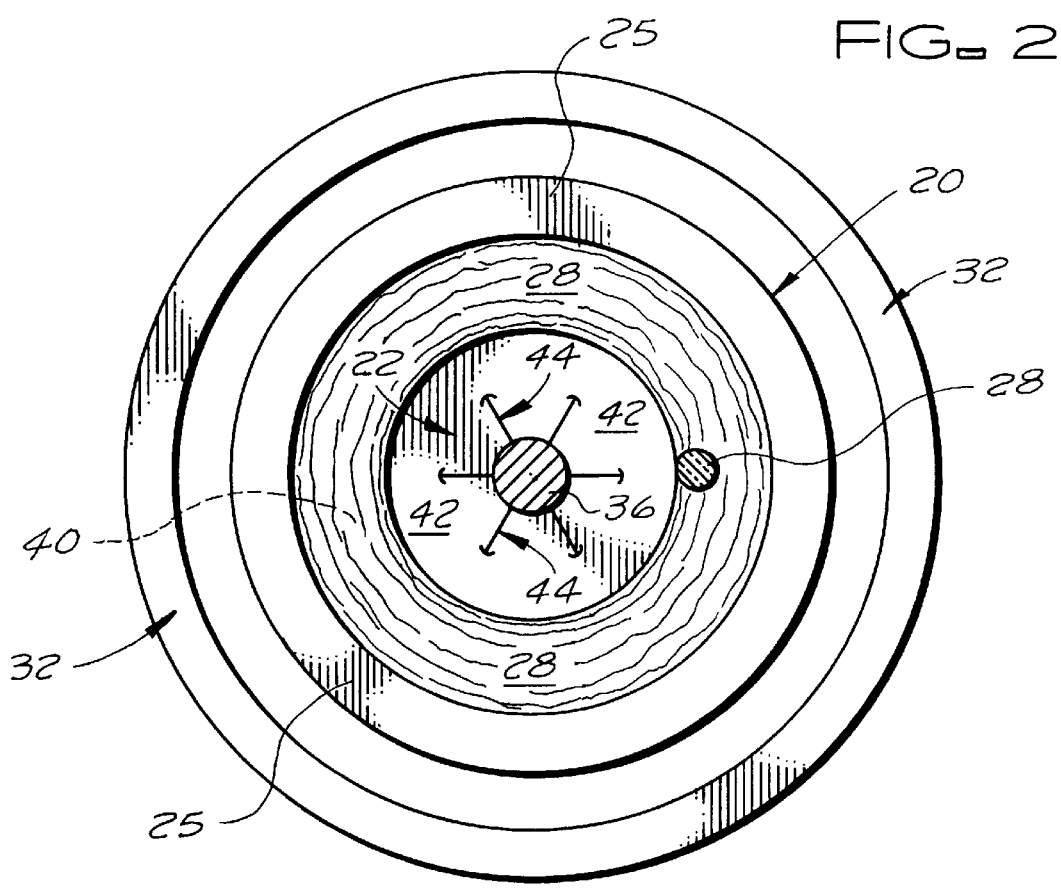
FIG. 2 is a schematic plan view of the fiberizing station of FIG. 1.

As shown in FIG. 1, a spinner disc 20 for fiberizing molten thermoplastic fiberizable materials in a rotary fiberizing process typically has a bottom disc or base plate 22 and an annular peripheral sidewall 24 integral with and extending upward from the base plate 22. The annular peripheral sidewall 24 has an upper annular reinforcing flange 25 and a plurality of rows of fiberizing holes 26 therein through which the molten thermoplastic fiberizable material 28, e.g. glass, is passed by centrifugal force to form glass fibers 30. Typically, the fibers 30 produced by passing the molten glass through the rows of fiberizing holes 26 in the spinner disc 20 are further attenuated by an annular curtain of hot, high velocity products of combustion and/or a high velocity annular curtain of air, steam, etc., discharged from an annular burner or manifold assembly and/or an annular air ring 32.

The base plate 22 has a central bore 34 located on the rotational axis of the spinner disc 20. The spinner disc 20 is mounted on a drive shaft 36 which passes through the central bore 34 and is clamped or otherwise secured to the base plate 22, e.g. by a nut 38 or similar fastener threaded onto the drive shaft. The base plate 22 has an outer annular portion 40 which receives the molten thermoplastic fiberizable material 28 that is introduced into the spinner disc 20 at a location offset from the center of the spinner disc, typically by several inches or more, and an inner annular portion 42 intermediate the outer annular portion 40 and the central bore 34. The centrifugal force caused by the rapid rotation of the spinner disc 20, which typically rotates at several thousand or more revolutions per minute, causes the molten thermoplastic fiberizable material 28 to flow outward from its point of introduction and up the sidewall of the spinner disc where the molten thermoplastic fiberizable material passes out through the fiberizing holes 26 (normally thousands to tens of thousands of fiberizing holes) and is formed into fibers.

If no steps are taken to alleviate stresses, with the introduction of the molten thermoplastic fiberizable material 28 onto the outer annular portion 40 of the base plate 22 (at a location offset from the central bore 34), a high transient stress can occur in the base plate 22 of the spinner disc 20 at the start-up of the fiberizing operation even though the spinner disc 20 is typically preheated prior to introducing the molten thermoplastic fiberizable material 28 into the spinner disc 20. The molten thermoplastic fiberizable material 28, which typically has a temperature in excess of 1800° F. heats up the outer annular portion 40 of the base plate relative to the inner annular portion 42 of the base plate 22, especially during start-up and prior to the process reaching a substantially steady state condition. The temperature differential between the outer annular portion 40 and the inner annular portion 42 of the base plate 22 can be in the range of from 800° F. to 900° F. or more during this transient start-up period. For example, the temperature of the base plate 22 in the outer annular portion 40 can be about 1400° F. or more while the temperature of the inner annular portion of the base plate 22 adjacent the central bore 34 can be about 500° F. This high transient temperature differential in the base plate 22 sets up compressive stresses in the outer portion 40 of the base plate 22 and tensile stresses in the inner portion 42 of the base plate 22 which, if not addressed, can result in the rupture of the base plate 22 and spinner disc failure.

In the spinner disc 20 of the present invention, the problem of high initial transient stresses is alleviated by a plurality of slits 44 which radiate outward from the periphery of the central bore 34 into the inner annular portion 42 of the base plate 22 and preferably, terminate short of the outer annular portion 40 of the base plate 22 where the molten thermoplastic fiberizable material 28 is introduced onto the base plate 22 of the spinner disc 20. The slits 44 are normally formed in the base plate by using an electron discharge machine, by laser, or by water jet. Preferably, these slits 44 open onto (are integral with) the central bore 34. However, it is contemplated that, provided the slits alleviated sufficient stress, the slits 44 could begin radially outward from but adjacent to the central bore 34 thereby creating a uninterrupted narrow collar (not shown) about the central bore 34.

Figure 3:
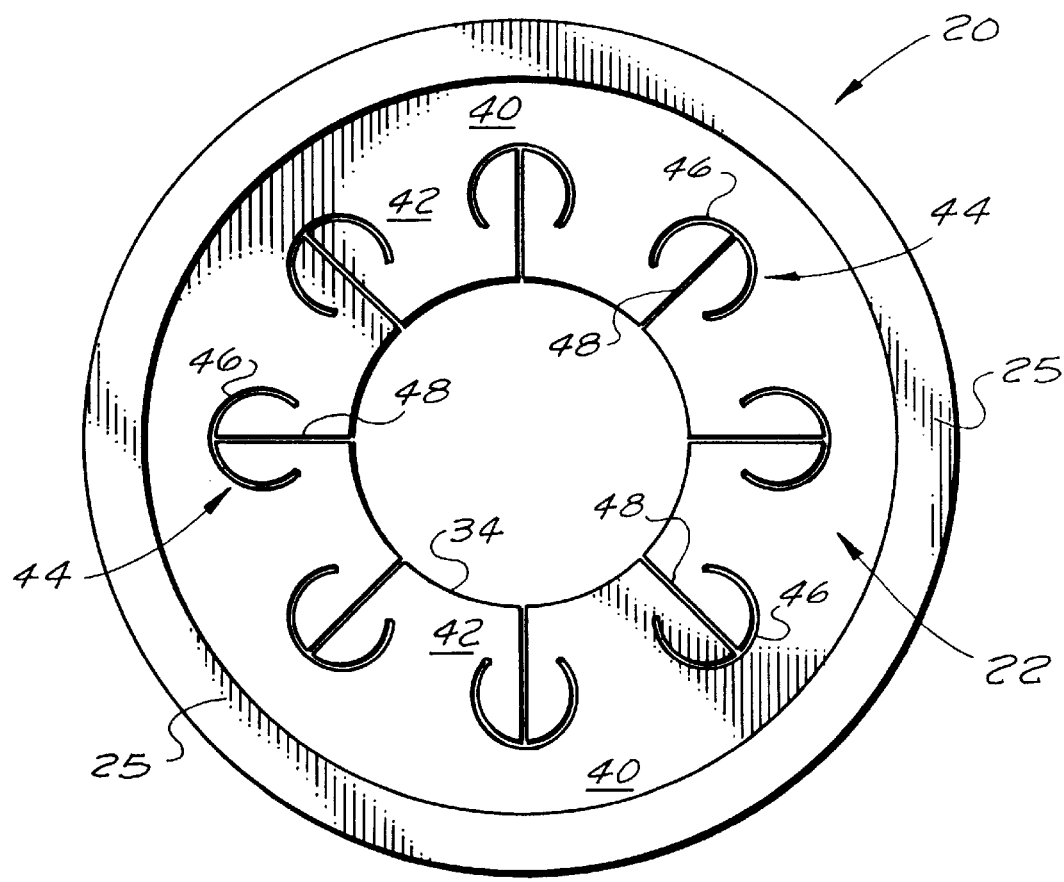
FIG. 3 is a schematic plan view of a spinner disc of the present invention.
Figure 4:
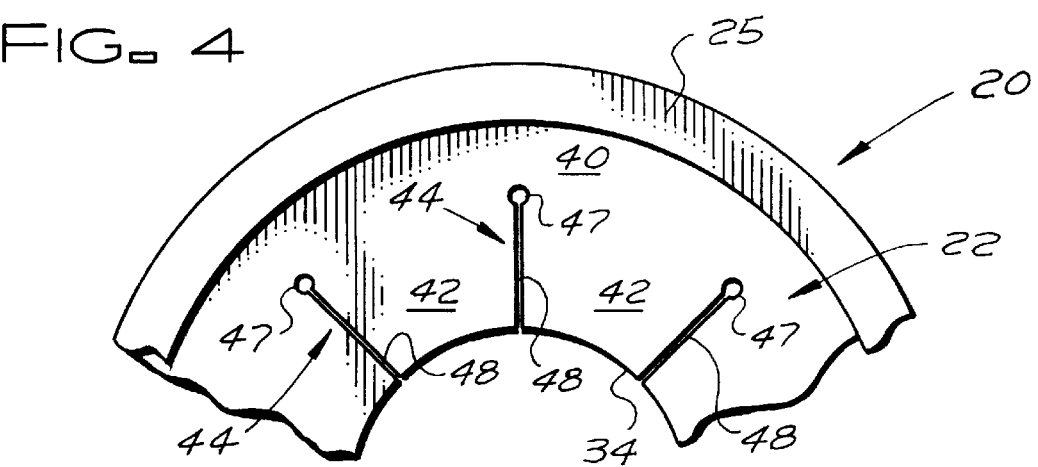
FIG. 4 is a partial schematic plan view of a spinner disc of the present invention.

The slits 44 are as narrow as practical and typically, range from about ten to about sixty thousands of an inch (0.010 to 0.060 inches) in width. As shown in FIGS. 3 and 4, preferably, the outer ends of the slits 44 terminate in arcuate shaped or substantially arcuate shaped slit portions 46 or enlarged circular shaped or substantially circular shaped hole portions 47 to further assure the lowering of overall stresses in the vicinity of the slits. The arcuate shaped slit portions 46 of the slits 44 are preferably bisected by inner radially extending portions 48 of the slits 44 and preferably, extend between about 90° to about 270°. Typically, the arcuate shaped slit portions have a radius between about one inch and about three inches. Preferably, the enlarged circular shaped hole portions 47 of the slits 44 are bisected by the inner radially extending portions 48 of the slits 44 and typically, the enlarged circular shaped hole portions 47 of the slits 44 are between about one quarter and about one inch in diameter. The inner radially extending portions 48 of the slits 44 typically extend radially for about one quarter of an inch to about four inches with the length of the inner radially extending portions 48 of the slits being determined in part by the radius or diameter of the spinner disc 20, the location of the off center introduction of the molten thermoplastic fiberizable material 28 onto the base plate 22 of the spinner disc 20 where the inner annular portion 42 of the base plate ends and the outer annular portion 40 of the base plate begins, and the degree or amount of stresses to be alleviated to prevent failure of the base plate 22. As an example, a typical spinner disc 20 having about a twenty inch to about a twenty two inch diameter may have six to eight slits 44 about three inches in length with a 270° arcuate portion having a diameter of about two inches. Preferably, the slits 44 are radially symmetrical or substantially radially symmetrical, number from two to twelve and more preferably from six to eight. A greater number of slits 44 than twelve can be used if required to alleviate the stresses and/or to further heat the underside of the spinner disc 20, especially on larger diameter spinner discs, e.g. spinner discs twenty or more inches in diameter.

It has been determined, that for a temperature differential of 800° F. between the outer annular portion 40 of the base plate 22 and the inner annular portion 42 of the base plate 22, adjacent the central bore 34, the inclusion of the slits 44 in the inner annular portion 42 of the base plate can easily reduce the maximum transient stresses within the base plate that occur during start-up by up to 30% to 50% or more when compared to an identical spinner disc without the slits 44.

In the method of the present invention for fiberizing hot molten thermoplastic fiberizable materials at high temperatures, such as but not limited to glass at temperatures in excess of 1800° F., the molten thermoplastic fiberizable material 28 is introduced onto the upper surface of the outer annular portion 40 of the base plate 22. The centrifugal force generated by the rapid rotation of the spinner disc 20 causes the molten thermoplastic fiberizable material to pass outward over the base plate from its point of introduction and up the outer annular sidewall of the spinner disc where the hot molten thermoplastic fiberizable material flows or passes out through the fiberizing holes 26 forming fibers. In this process of fiberization, hot gases are formed under positive pressure within the spinner disc 20 from the hot molten thermoplastic fiberizable material 28 introduced into the spinner disc to be fiberized (e.g. glass) and, in some applications, from the burning of gases within or the introduction of hot gases into the interior of the spinner disc 20 from a burner or manifold (not shown) to help maintain the hot molten thermoplastic fiberizable material within the spinner disc within a desired temperature range for good fiberization. At the rotational speeds used for fiberization, e.g. several thousand or more revolutions per minute, these hot gases flow out through the slits 44 and along the underside of the spinner disc 20 toward the lower outside corner of the spinner disc 20. Thus, these hot gases push relatively cool ambient air out of this region and replace the relatively cool ambient air to help maintain the heat in the lower portion of the spinner disc sidewall 24 and the temperature of this lower portion of the sidewall and the fiberizing holes 26 in this lower portion of the sidewall at a higher temperature for better fiberization.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A spinner disc for a rotary fiberization process, comprising:
a base plate with an annular periphery, an annular peripheral sidewall extending upward from the base plate and integral with the base plate; the annular peripheral sidewall having a plurality of rows of fiberizing holes therein for fiberizing thermoplastic fiberizable materials by centrifugal force; the base plate having a central bore therein on a rotational axis of the spinner disc for mounting the spinner disc on a drive shaft; the base plate having an outer annular portion for receiving molten thermoplastic fiberizable materials to be fiberized; the base plate having an inner annular portion intermediate the central bore and the outer annular base plate portion; and the base plate having a plurality of slits in the inner annular portion passing completely through the base plate from an upper surface of the base plate to a lower surface of the base plate and radiating outward from and integral with the central bore to relieve stresses in the base plate and permit gases to pass out from within the spinner disc during operation.

2. The spinner disc according to claim 1, wherein:
the slits in the base plate are substantially radially symmetrical.

3. The spinner disc according to claim 1, wherein:
each of the slits in the base plate has an arcuate shaped portion at an outer end of the slit to lower stresses.

4. The spinner disc according to claim 1, wherein:
each of the slits in the base plate has an enlarged circular shaped portion at an outer end of the slit to lower stresses.

5. The spinner disc according to claim 1, wherein:
the slits in the base plate do not extend radially outward into the outer annular portion of the base plate where molten thermoplastic fiberizable materials are to be received for fiberization.

6. The spinner disc according to claim 1, wherein:
there are at least three slits in the base plate.

7. The spinner disc according to claim 6, wherein:
the slits in the base plate are substantially radially symmetrical.

8. The spinner disc according to claim 7, wherein:
each of the slits in the base plate has an arcuate shaped portion at an outer end of the slit to lower stresses.

9. The spinner disc according to claim 8, wherein:
the slits in the base plate do not extend radially outward into the outer annular portion of the base plate where molten thermoplastic fiberizable materials are to be received for fiberization.

10. The spinner disc according to claim 7, wherein:
each of the slits in the base plate has an enlarged circular shaped portion at an outer end of the slit to lower stresses.

11. The spinner disc according to claim 10, wherein:
the slits in the base plate do not extend radially outward into the outer annular portion of the base plate where molten thermoplastic fiberizable materials are to be received for fiberization.

12. The spinner disc according to claim 1, wherein:
there are at least six slits in the base plate.

13. The spinner disc according to claim 12, wherein:
the slits in the base plate are substantially radially symmetrical.

14. The spinner disc according to claim 13, wherein:
each of the slits in the base plate has an arcuate shaped portion at an outer end of the slit to lower stresses.

15. The spinner disc according to claim 14, wherein:
the slits in the base plate do not extend radially outward into the outer annular portion of the base plate where molten thermoplastic fiberizable materials are to be received for fiberization.

16. The spinner disc according to claim 13, wherein:
each of the slits in the base plate has an enlarged circular shaped portion at an outer end of the slit to lower stresses.

17. The spinner disc according to claim 16, wherein:
the slits in the base plate do not extend radially outward into the outer annular portion of the base plate where molten thermoplastic fiberizable materials are to be received for fiberization.

18. The spinner disc according to claim 1, wherein:
for a temperature differential of 800° F. or more between the outer annular portion of the base plate and the inner annular portion of the base plate adjacent the periphery of the central bore the slits cause a maximum stress reduction in the base plate of at least 10%.

19. The spinner disc according to claim 1, wherein:
for a temperature differential of 800° F. or more between the outer annular portion of the base plate and the inner annular portion of the base plate adjacent the periphery of the central bore the slits cause a maximum stress reduction in the base plate of at least 30%.

20. A method of fiberizing molten thermoplastic fiberizable materials in a rotary fiberization process, comprising:
rotating a spinner disc; the spinner disc having a base plate with an annular periphery and an annular peripheral sidewall extending upward from the base plate and integral with the base plate; the annular peripheral sidewall having a plurality of rows of fiberizing holes therein for fiberizing molten thermoplastic fiberizable materials by centrifugal force; the base plate having a central bore therein located on a rotational axis of the spinner disc and mounted on a rotating drive shaft; the base plate having an outer annular portion for receiving molten thermoplastic fiberizable materials to be fiberized; the base plate having an inner annular portion intermediate the central bore and the outer annular base plate portion; and the base plate having a plurality of slits in the inner annular portion passing completely through the base plate from an upper surface of the base plate to a lower surface of the base plate and radiating outward from and integral with the central bore to relieve stresses in the base plate and permit gases to pass out from within the spinner disc during operation;
introducing a molten thermoplastic fiberizable material onto the upper surface of the base plate in the outer annular portion of the base plate; and
fiberizing the molten fiberizable material by passing the molten fiberizable material radially outward through the fiberizing holes in the annular peripheral sidewall of the spinner disc.

21. The method of fiberizing molten thermoplastic fiberizable materials in a rotary fiberization process, according to claim 20 wherein:
the molten thermoplastic fiberizable material is introduced onto the upper surface of the outer annular portion of the base plate at a temperature in excess of 1800° F. and hot gases are passed from within the spinner disc through the slits to heat an underside of the spinner disc.

22. The method of fiberizing molten thermoplastic fiberizable materials in a rotary fiberization process, according to claim 21 wherein:
the slits cause a maximum stress reduction in the base plate of at least 10% when the molten fiberizable material is initially introduced into the spinner disc.

23. The method of fiberizing molten thermoplastic fiberizable materials in a rotary fiberization process, according to claim 21 wherein:
the slits cause a maximum stress reduction in the base plate of at least 30% when the molten fiberizable material is initially introduced into the spinner disc.

24. The method of fiberizing molten thermoplastic fiberizable materials in a rotary fiberization process according to claim 20, wherein:
the slits in the base plate of the spinner disc are substantially radially symmetrical.

25. The method of fiberizing molten thermoplastic fiberizable materials in a rotary fiberization process according to claim 20, wherein:
each of the slits in the base plate of the spinner disc has an arcuate shaped portion at an outer end of the slit to lower stresses.

26. The method of fiberizing molten thermoplastic fiberizable materials in a rotary fiberization process according to claim 20, wherein:
each of the slits in the base plate of the spinner disc has an enlarged circular shaped portion at an outer end of the slit to lower stresses.

27. The method of fiberizing molten thermoplastic fiberizable materials in a rotary fiberization process according to claim 20, wherein:
the slits in the base plate of the spinner disc do not extend radially outward into the outer annular portion of the base plate where the thermoplastic fiberizable materials are received for fiberization.

28. The method of fiberizing molten thermoplastic fiberizable materials in a rotary fiberization process according to claim 20, wherein:
there are at least three slits in the base plate of the spinner disc.

29. The method of fiberizing molten thermoplastic fiberizable materials in a rotary fiberization process according to claim 28, wherein:
the slits in the base plate of the spinner disc are substantially radially symmetrical.

30. The method of fiberizing molten thermoplastic fiberizable materials in a rotary fiberization process according to claim 29, wherein:
each of the slits in the base plate of the spinner disc has an arcuate shaped portion at an outer end of the slit to lower stresses.

31. The method of fiberizing molten thermoplastic fiberizable materials in a rotary fiberization process according to claim 30, wherein:
the slits in the base plate of the spinner disc do not extend radially outward into the outer annular portion of the base plate where the thermoplastic fiberizable materials are received for fiberization.

32. The method of fiberizing molten thermoplastic fiberizable materials in a rotary fiberization process according to claim 29, wherein:
each of the slits in the base plate of the spinner disc has an enlarged circular shaped portion at an outer end of the slit to lower stresses.

33. The method of fiberizing molten thermoplastic fiberizable materials in a rotary fiberization process according to claim 32, wherein:
the slits in the base plate of the spinner disc do not extend radially outward into the outer annular portion of the base plate where the thermoplastic fiberizable materials are received for fiberization.

34. The method of fiberizing molten thermoplastic fiberizable materials in a rotary fiberization process according to claim 20, wherein:
there are at least six slits in the base plate of the spinner disc.

35. The method of fiberizing molten thermoplastic fiberizable materials in a rotary fiberization process according to claim 34, wherein:

the slits in the base plate of the spinner disc are substantially radially symmetrical.

36. The method of fiberizing molten thermoplastic fiberizable materials in a rotary fiberization process according to claim 35, wherein:

each of the slits in the base plate of the spinner disc has an arcuate shaped portion at an outer end of the slit to lower stresses.

37. The method of fiberizing molten thermoplastic fiberizable materials in a rotary fiberization process according to claim 36, wherein:

the slits in the base plate of the spinner disc do not extend radially outward into the outer annular portion of the base plate where the thermoplastic fiberizable materials are received for fiberization.

38. The method of fiberizing molten thermoplastic fiberizable materials in a rotary fiberization process according to claim 35, wherein:

each of the slits in the base plate of the spinner disc has an enlarged circular shaped portion at an outer end of the slit to lower stresses.

39. The method of fiberizing molten thermoplastic fiberizable materials in a rotary fiberization process according to claim 38, wherein:

the slits in the base plate of the spinner disc do not extend radially outward into the outer annular portion of the base plate where the thermoplastic fiberizable materials are received for fiberization.

* * * * *